US008715865B2

(12) United States Patent
Xu et al.

(10) Patent No.: US 8,715,865 B2
(45) Date of Patent: May 6, 2014

(54) NON-AQUEOUS ELECTROLYTIC SOLUTIONS AND ELECTROCHEMICAL CELLS COMPRISING THE SAME

(75) Inventors: Wu Xu, Broadview Heights, OH (US);
Pascal Bolomey, Solon, OH (US);
Martin W. Payne, Avon, OH (US)

(73) Assignee: BASF Corporation, Florham Park, NJ (US)

( * ) Notice: Subject to any disclaimer, the term of this patent is extended or adjusted under 35 U.S.C. 154(b) by 1259 days.

(21) Appl. No.: 11/775,950

(22) Filed: Jul. 11, 2007

(65) Prior Publication Data
US 2009/0017386 A1    Jan. 15, 2009

(51) Int. Cl.
*H01M 10/40*    (2006.01)
*H01M 10/38*    (2006.01)

(52) U.S. Cl.
USPC ........... 429/331; 429/338; 429/332; 429/330; 429/333; 29/623.2

(58) Field of Classification Search
CPC ................. H01M 10/056; H01M 10/0569
USPC ................. 429/330–338; 29/623.2
See application file for complete search history.

(56) References Cited

U.S. PATENT DOCUMENTS

| 5,626,981 | A | 5/1997 | Simon et al. |
| 6,315,918 | B1 | 11/2001 | Mita et al. |
| 6,344,293 | B1 | 2/2002 | Geronov |
| 6,919,145 | B1 | 7/2005 | Kotato et al. |
| 7,026,074 | B2 | 4/2006 | Chen et al. |
| 7,223,502 | B2 * | 5/2007 | Onuki .......................... 429/326 |
| 7,238,453 | B2 | 7/2007 | Xu et al. |
| 7,255,965 | B2 | 8/2007 | Xu et al. |
| 2006/0236528 | A1 | 10/2006 | Xu et al. |
| 2006/0269844 | A1 | 11/2006 | Deng et al. |
| 2006/0269845 | A1 * | 11/2006 | Xu et al. ....................... 429/326 |
| 2006/0269846 | A1 | 11/2006 | Xu et al. |
| 2007/0224515 | A1 | 9/2007 | Xu et al. |
| 2007/0231706 | A1 | 10/2007 | Xu et al. |
| 2007/0243470 | A1 * | 10/2007 | Yamamoto et al. ........... 429/326 |
| 2008/0118844 | A1 * | 5/2008 | Miyamoto et al. ............ 429/338 |

FOREIGN PATENT DOCUMENTS

| CN | 1969410 | 5/2007 |
| JP | 4-87156 | 3/1992 |
| JP | 2006/012806 | 1/2006 |
| JP | 2007/073318 | 3/2007 |
| JP | 2007073318 A * | 3/2007 ............ H01M 10/40 |

OTHER PUBLICATIONS

I. Cho et al., "Radical Polymerization of 4-methylene-I, 3-dioxolan-2-one and its Hydrolyzed Water-Soluble Polymer", Makromol. Chem., Rapid Commun. 10, pp. 453 to 456 (1989).*

(Continued)

*Primary Examiner* — Karie O'Neill Apicella
(74) *Attorney, Agent, or Firm* — Raymond Keller (57) ABSTRACT

Non-aqueous electrolyte solutions capable of protecting negative electrode materials such as lithium metal and carbonaceous materials in energy storage electrochemical cells (e.g., lithium metal batteries, lithium ion batteries and supercapacitors) include an electrolyte salt, a non-aqueous electrolyte solvent mixture, an unsaturated organic compound 4-methylene-1,3-dioxolan-2-one or 4,5-dimethylene-1,3-dioxolan-2-one, and other optional additives. The 1,3-dioxolan-2-ones help to form a good solid electrolyte interface on the negative electrode surface.

13 Claims, 2 Drawing Sheets

(56) References Cited

OTHER PUBLICATIONS

Japanese Patent Abstract Publication No. 62-290072 published Dec. 16, 1987, one page.
Japanese Patent Abstract Publication No. 2000-58122 published Feb. 25, 2000, one page.
Chung et al., "Origin of Graphite Exfoliation," Journal of The Electrochemical Society, 147 (12) pp. 4391-4398 (2000).
I. Cho et al., "Radical Polymerization of 4-methylene-1, 3-dioxolan-2-one and its Hydrolyzed Water-Soluble Polymer", Makromol. Chem., Rapid Commun. 10, pp. 453 to 456 (1989).
Office Action Issued in Corresponding European Application No. 08770920 dated Sep. 27, 2010, seven pages.
Japanese Abstract for Publication No. 04087156 published Mar. 13, 1992, one page.
"Machine Translation of JP-2006/012806", 5 pages.
"Machine Translation of JP-2007/073318", 25 pages.

* cited by examiner

NON-AQUEOUS ELECTROLYTIC SOLUTIONS AND ELECTROCHEMICAL CELLS COMPRISING THE SAME

FIELD OF THE INVENTION

The present invention relates to a non-aqueous electrolytic solution and an electrochemical energy storage device comprising the same. More particularly, this invention pertains to non-aqueous electrolytic solutions that comprise (a) one or more solvents; (b) one or more ionic salts; and (c) one or more additives. Non-aqueous electrolytic solutions capable of protecting negative electrode materials such as lithium metal and carbonaceous materials in energy storage electrochemical cells (e.g., lithium metal batteries, lithium ion batteries and supercapacitors) include an unsaturated cyclic carbonate, in particular 4-methylene-1,3-dioxolan-2-one or 4,5-dimethylene-1,3-dioxolan-2-one, or combinations thereof.

BACKGROUND

State-of-the-art lithium ion batteries commonly use electrolytes containing lithium hexafluorophosphate (LiPF$_6$) as solute and mixtures of cyclic carbonates and linear carbonates as solvents. Ethylene carbonate (EC) is the indispensable cyclic carbonate for the formation of stable solid electrolyte interface (SEI) at the surface of the negative electrode so that good battery performances can be achieved or enhanced, especially the long cycle life.

However, in many cases the SEI protection from conventional electrolytes with simple formulations such as LiPF$_6$ in mixtures of EC and linear carbonates is insufficient in lithium ion batteries where the negative electrode materials are carbonaceous materials including graphite carbons and non-graphite carbons, for example inexpensive natural graphite (a kind of graphite carbon) and hard carbon (a kind of amorphous non-graphite carbon), which exhibits a higher initial discharge capacity but quickly loses capacity in subsequent cycles.

On the other hand, EC has a high melting point, at about 36-38° C., which limits the performance of lithium ion batteries containing EC-based electrolytes in low temperature applications. The addition of a large amount of co-solvents with low viscosity and low melting points such as linear carbonates and carboxylate esters can improve cell performance at low temperatures. Unfortunately, such co-solvents have low boiling points and are highly flammable, which present safety issues and problems in high temperature applications. Thus propylene carbonate (PC) which has a structure similar to that of EC has been considered to fully or partially replace EC so as to reduce the amount of other co-solvents in the electrolytic solutions because PC remains in the liquid state over a wide temperature window from −55° C. to 240° C. However, LiPF$_6$—PC based electrolytes are not compatible with graphite electrode in lithium ion batteries due to the exfoliation of graphite structure by PC intercalation.

Therefore, one or more other chemical compounds, either organic or inorganic, are needed in electrolytes to form better SEI films on the disordered graphite electrodes or other carbonaceous electrodes to prevent or reduce further decomposition of solvent molecules over long service lives and to prevent the intercalation of PC into the graphite structure, so as to improve the performance of lithium ion batteries using natural graphite or hard carbon as negative electrode and containing PC in the electrolytes.

Sanyo Electric Co., Ltd. disclosed in JP 04095362 and EP 490048 the use of vinylene carbonate (VC) as co-solvents in electrolytes for lithium ion batteries. U.S. Pat. No. 5,626,981 by Bernard Simon and Jean-Pierre Boeuve of SAFT disclosed the use of vinylene carbonate and its derivatives as additives in an amount from 0.01% to 10% by weight in electrolytic solutions to help generate a passivation layer on the carbonaceous anode before any intercalation of solvated lithium ions. The passivation layer constitutes a physical barrier preventing the intercalation of solvent molecules surrounding the lithium ions and thus the lithium ion could penetrate into the carbon by itself but the exfoliation was prevented.

Seiji Yoshimura, et al. of Sanyo Denki disclosed in JP 04087156 that lithium batteries using electrolytic solvents having unsaturated C—C bonds such as vinylethylene carbonate (VEC) had low self-discharge. Minoru Kotato et al. of Mitsubishi Chemical Corporation disclosed in WO 2000/079632 that the solvents containing vinylethylene carbonate in an amount from 0.01 to 20% by weight minimized decomposition of the electrolytes and could provide a high capacity as well as excellent storage properties and cycle life performance.

Yoshinori Toyoguchi, et al. of Matsushita Electric Industrial Co., Ltd. disclosed in JP 62290072 that 1,3-dioxolan-2-ones having Cl- and/or F-substituents at the 4- and/or 5-positions were used as electrolytic solvents for secondary batteries. Roderick S. McMillan and coworkers disclosed in WO 9815024 that fluoroethylene carbonate (FEC) is capable of forming a very stable passivation film that is insoluble in the electrolyte, which substantially improved secondary battery efficiency and high capacity retention.

Kang Xu and coworkers reported in Electrochemical and Solid-State Letters (2002), 5(11), A259-A262 that lithium bis(oxalato)borate (i.e. LiBOB) could stabilize graphitic anode materials in electrolytes containing propylene carbonate (PC) while supporting reversible Li ion intercalation/deintercalation, a behavior not yet observed for other electrolytic salts. The exfoliation of graphite in PC was prevented.

G. Chung, et al. reported in Journal of Electrochemical Society (2000), 147(12), 4391-4398 that the energy level of the lowest unoccupied molecular orbital (LUMO) energy of a compound's molecule could predict its readiness to be electrochemically reduced at the negative electrode. This semi-empirical rule has been developed to facilitate the screening process of searching for potential SEI additives and it is very helpful. It is believed that a molecule with a lower LUMO energy will be a better electron acceptor and hence more reactive at the surface of the negative electrode.

SUMMARY OF THE INVENTION

The present invention provides a non-aqueous electrolytic solution having a long cycle life and a high capacity retention for lithium metal and lithium ion battery using the same. Particularly the present invention provides a non-aqueous electrolytic solution having a cyclic unsaturated organic compound, 4-methylene-1,3-dioxolan-2-one, i.e. methyleneethylene carbonate (MEC) with the following chemical structure (I), or 4,5-dimethylene-1,3-dioxolan-2-one, i.e. dimethyleneethylene carbonate (DMEC) with the following chemical structure (II), as additives in non-aqueous electrolytic solutions for rechargeable batteries to form a good solid-electrolyte interface (SEI) on the negative electrode surface of the batteries. Batteries using the electrolytic solutions with such unsaturated carbonate additive have long life and high capacity retention.

The electrolytic solution in the present invention comprises (a) one or more solvents, (b) one or more lithium salts, and (c) one or more additives. Typical lithium salts include $LiPF_6$, $LiBF_4$, $LiAsF_6$, $LiClO_4$, $LiCF_3SO_3$, $LiN(SO_2CF_3)_2$, $LiN(SO_2F)_2$, $LiB(C_2O_4)_2$ (i.e. LiBOB), $LiBF_2C_2O_4$ (i.e. LiDFOB), $Li_2B_{12}F_xH_{(12-x)}$ where x=0-12, and others, while typical solvents include ethylene carbonate (EC), propylene carbonate (PC), dimethyl carbonate (DMC), diethyl carbonate (DEC), ethylmethyl carbonate (EMC), γ-butyrolactone (GBL), methyl butyrate (MB), propyl acetate (PA), and others.

An embodiment of the invention is a secondary battery comprising an anode, a cathode, and an electrolytic solution, the electrolytic solution comprising a non-aqueous electrolytic solvent selected from the group consisting of 4-methylene-1,3-dioxolan-2-one, 4,5-dimethylene-1,3-dioxolan-2-one, and combinations thereof.

Another embodiment is a secondary battery comprising an anode, a cathode, a lithium salt, and an electrolytic solution, the electrolytic solution comprising a non-aqueous electrolytic solvent selected from the group consisting of 4-methylene-1,3-dioxolan-2-one, 4,5-dimethylene-1,3-dioxolan-2-one, and combinations thereof, provided that the total concentration of 4-methylene-1,3-dioxolan-2-one and 4,5-dimethylene-1,3-dioxolan-2-one in the solution does not exceed about 10 wt % of the electrolytic solution.

Yet another embodiment of the invention is a method of making a lithium battery or lithium ion battery comprising:
a. providing an electrolytic solution comprising
  i. a non-aqueous solvent selected from the group consisting of 4-methylene-1,3-dioxolan-2-one, 4,5-dimethylene-1,3-dioxolan-2-one, and combinations thereof;
  ii. a lithium salt,
b. laminating and winding a cathode, a first porous separator, an anode, and a second porous separator,
c. placing the wound laminated electrodes and separators into a battery case,
d. infusing the electrolytic solution into the battery case, and
e. sealing the battery case containing the electrodes, electrolytic solution and separators.

These and other features and advantages of the present invention will become more readily apparent to those skilled in the art upon consideration of the following detailed description that described both the preferred and alternative embodiments of the present invention.

DETAILED DESCRIPTION OF THE INVENTION

Figure 1:
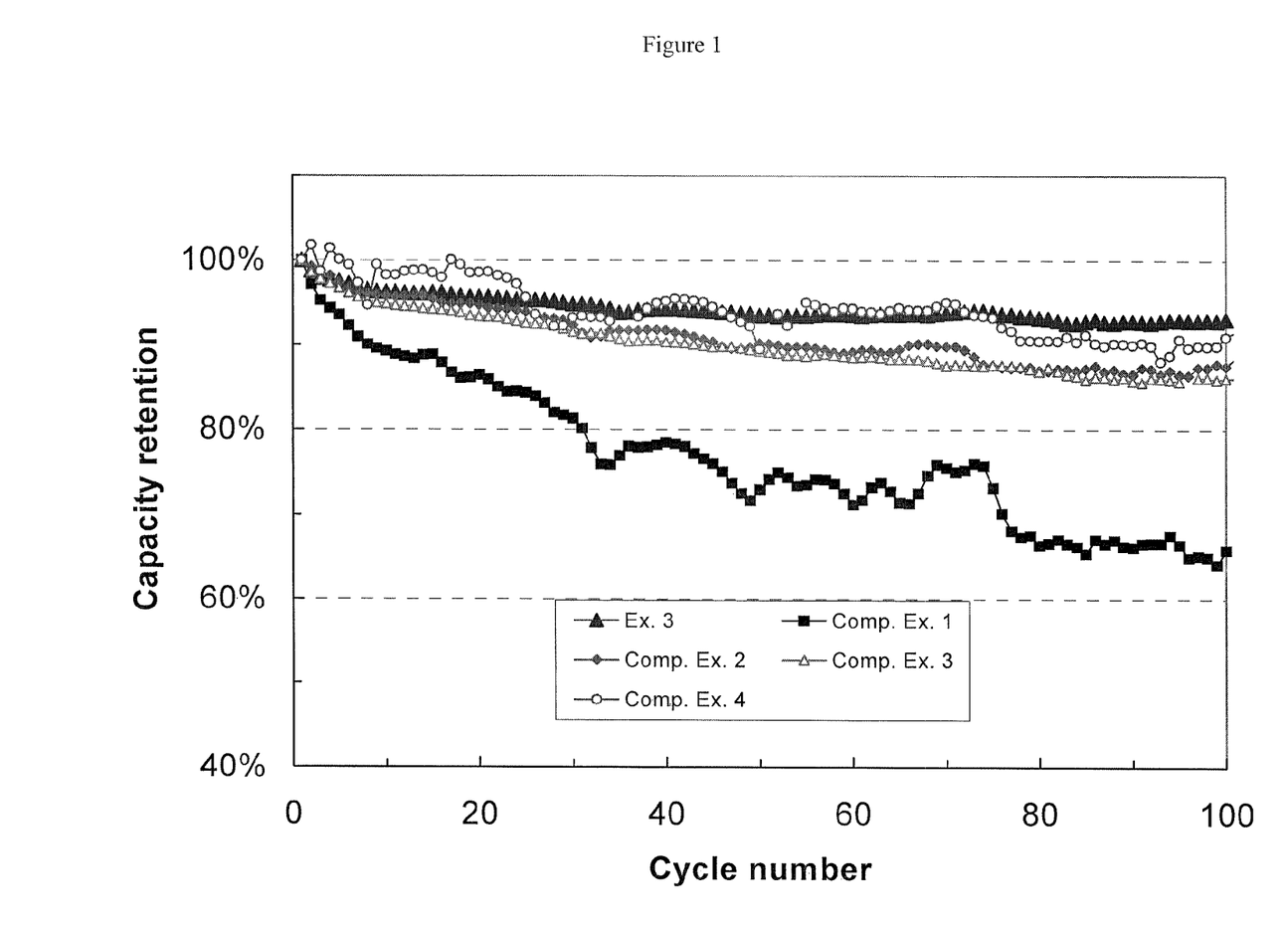
FIG. 1 compares the discharge capacity retention of $LiCoO_2$/synthetic graphite coin type batteries of CR2032 size among Inventive Example 3 and Comparative Examples 1-4.
Figure 2:
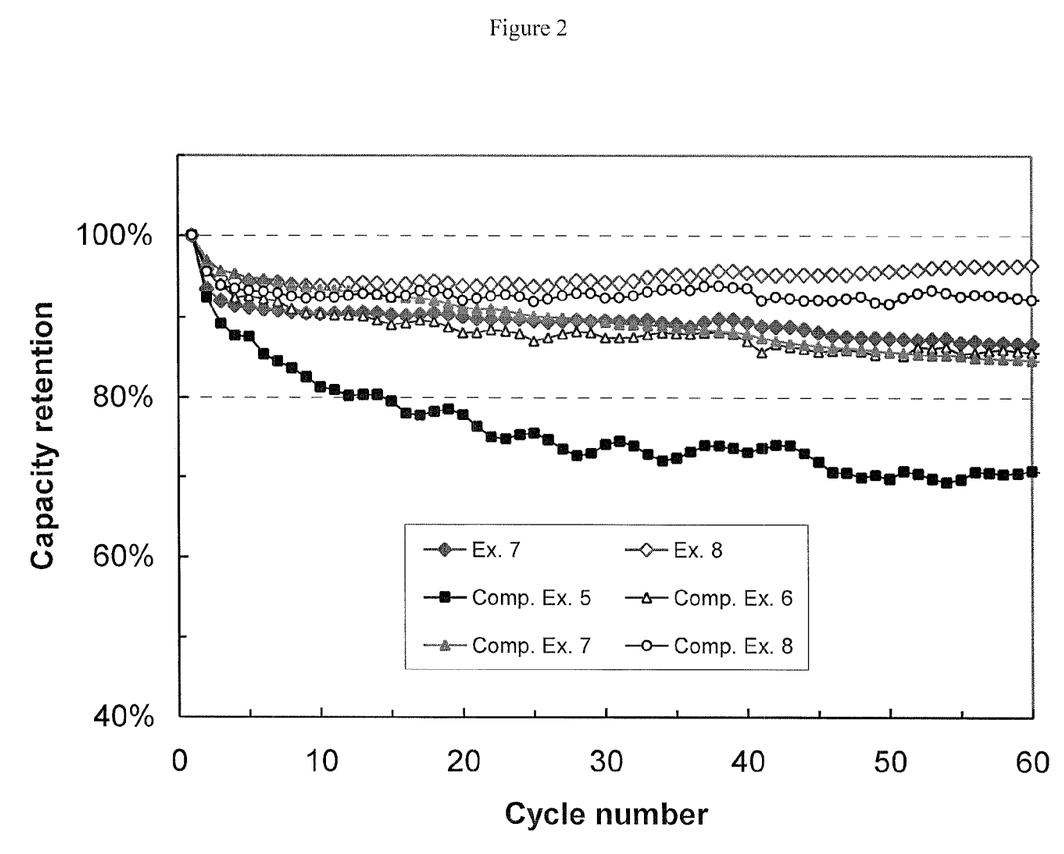
FIG. 2 compares the discharge capacity retention of $LiCoO_2$/synthetic graphite coin type batteries of CR2032 size among Inventive Examples 7-8 and Comparative Examples 5-8.

The following embodiments describe the preferred mode presently contemplated for carrying out the invention and are not intended to describe all possible modifications and variations consistent with the spirit and purpose of the invention. These and other features and advantages of the present invention will become more readily apparent to those skilled in the art upon consideration of the following detailed description that describes both the preferred and alternative embodiments of the present invention.

The invention provides a secondary battery comprising an anode, a cathode, and an electrolytic solution. The electrolytic solution comprises a non-aqueous electrolytic solvent, a salt, and additives. The major components, additives, solvent, salt, anode and cathode are each described in turn hereinbelow.

Additives. The non-aqueous electrolytic solution and the lithium ion battery of the present invention can be obtained by using 4-methylene-1,3-dioxolan-2-one (MEC), with chemical structure (I), or 4,5-dimethylene-1,3-dioxolan-2-one (DMEC), with chemical structure (II), as an additive in the solution:

The inventors herein have performed orbital energy calculations for several additives for use in lithium ion batteries to determine the LUMO (lowest unoccupied molecular orbital) energy of such additives. As seen by the LUMO energies of the additives in the present invention, (calculated by the ECHIP 7.0 software from ECHIP, Inc., of Hockessin Del.), along with other commonly used SEI additives in lithium ion battery industry, both 4-methylene-1,3-dioxolan-2-one and 4,5-dimethylene-1,3-dioxolan-2-one are suitable additives for the stabilization of lithium ion batteries. The calculated LUMO energy results are listed in Table 1.

TABLE 1

LUMO energy of selected additives calculated by ECHIP 7.0 PM3 Program

| Additive | LUMO energy (eV) |
| --- | --- |
| 1,3-Dioxol-2-one (Vinylene carbonate) | 0.089 |
| 4-Vinyl-1,3-dioxolan-2-one (Vinylethylene carbonate) | 0.359 |
| 4-Fluoro-1,3-dioxolan-2-one (Fluoroethylene carbonate) | 0.906 |

TABLE 1-continued

LUMO energy of selected additives calculated by
ECHIP 7.0 PM3 Program

| Additive | LUMO energy (eV) |
|---|---|
| 4-Methylene-1,3-dioxolan-2-one (Methyleneethylene carbonate) | 0.164 |
| 4,5-Dimethylene-1,3-dioxolan-2-one (Dimethyleneethylene carbonate) | −0.610 |
| 4-Methylene-5-methyl-1,3-dioxolan-2-one | 0.209 |
| 4-Methylene-5,5-dimethyl-1,3-dioxolan-2-one | 0.246 |
| 4-Ethylidene-1,3-dioxolan-2-one | 0.138 |

It is seen that the LUMO energy of 4-methylene-1,3-dioxolan-2-one in the present invention is 0.164 eV, just slightly higher than the LUMO energy of vinylene carbonate, which is 0.089 eV, but lower than that of vinylethylene carbonate (0.359 eV) and fluoroethylene carbonate (0.906 eV). On the other hand, the LUMO energy of 4,5-dimethylene-1,3-dioxolan-2-one has a large negative value (−0.610 eV), which is lower even than that of vinylene carbonate. Therefore, both unsaturated carbonate compounds in the present invention are likely candidates for use as SEI formation agents for the negative electrode of a lithium ion battery on the basis of the aforementioned semi-empirical rule of LUMO energy.

It is also seen from Table 1 that 4-methylene-5-methyl-1,3-dioxolan-2-one, 4-methylene-5,5-dimethyl-1,3-dioxolan-2-one and 4-ethylidene-1,3-dioxolan-2-one each also have low LUMO energies, which suggests that these unsaturated carbonate compounds can also be used as the SEI formation agents for the negative electrode of a lithium ion battery.

The content of the unsaturated carbonate compound of the present invention in the non-aqueous electrolytic is normally about 0.01 to about 20% by weight, preferably about 0.01 to about 10% by weight, more preferably about 0.05 to about 6% by weight, and even more preferably about 0.1 to about 4% by weight.

Solvents. The solvents to be used with the above-mentioned methyleneethylene carbonate or dimethyleneethylene carbonate are a mixture of non-aqueous, aprotic, and polar organic compounds. Generally, solvents may be carbonates, carboxylates, ethers, lactones, sulfones, phosphates, and nitriles. Useful carbonate solvents herein include but are not limited to cyclic carbonate such as ethylene carbonate, propylene carbonate, butylene carbonate, and linear carbonate such as dimethyl carbonate, diethyl carbonate, di(2,2,2-trifluoroethyl)carbonate, dipropyl carbonate, dibutyl carbonate, ethyl methyl carbonate, 2,2,2-trifluorethyl methyl carbonate, methyl propyl carbonate, ethyl propyl carbonate, 2,2,2-trifluorethyl propyl carbonate. Useful carboxylate solvents include but are not limited to methyl formate, ethyl formate, propyl formate, butyl formate, methyl acetate, ethyl acetate, propyl acetate, butyl acetate, methyl propionate, ethyl propionate, propyl propionate, butyl propionate, methyl butyrate, ethyl butyrate, propyl butyrate, butyl butyrate. Useful ethers include but are not limited to tetrahydrofuran, 2-methyl tetrahydrofuran, 1,3-dioxolane, 1,4-dioxane, 1,2-dimethoxyethane, 1,2-diethoxyethane, 1,2-dibutoxyethane, methyl nonafluorobutyl ether, ethyl nonafluorobutyl ether. Useful lactones include but are not limited to γ-butyrolactone, 2-methyl-γ-butyrolactone, 3-methyl-γ-butyrolactone, 4-methyl-γ-butyrolactone, β-propiolactone, and δ-valerolactone. Useful phosphates include but are not limited to trimethyl phosphate, triethyl phosphate, tris(2-chloroethyl)phosphate, tris(2,2,2-trifluoroethyl)phosphate, tripropyl phosphate, triisopropyl phosphate, tributyl phosphate, trihexyl phosphate, triphenyl phosphate, tritolyl phosphate, methyl ethylene phosphate and ethyl ethylene phosphate. Useful sulfones include but are not limited to non-fluorinated sulfones such as dimethyl sulfone, ethyl methyl sulfone, partially fluorinated sulfones such as methyl trifluoromethyl sulfone, ethyl trifluoromethyl sulfone, methyl pentafluoroethyl sulfone, ethyl pentafluoroethyl sulfone, and fully fluorinated sulfones such as di(trifluoromethyl)sulfone, di(pentafluoroethyl)sulfone, trifluoromethyl pentafluoroethyl sulfone, trifluoromethyl nonafluorobutyl sulfone, pentafluoroethyl nonafluorobutyl sulfone. Useful nitriles include but not limited to acetonitrile, propionitrile, and butyronitrile. Two or more of these solvents may be used in mixtures. Other solvents may be used as long as they are non-aqueous and aprotic, and are capable of dissolving the salts, such as N,N-dimethyl formamide, N,N-dimethyl acetamide, N,N-diethyl acetamide, and N,N-dimethyl trifluoroacetamide.

The electrolytic solvent is a mixed solvent including a cyclic carbonate, a linear carbonate and/or other non-aqueous, aprotic, and polar organic compounds as noted hereinabove. Overall, the non-aqueous electrolytic solution comprises about 10% to about 99% by weight, preferably about 40% to about 97% by weight, and more preferably about 60% to about 95% by weight of one or more solvents. In a preferred embodiment, the solvent is selected from the group consisting of ethylene carbonate (EC), propylene carbonate (PC), dimethyl carbonate (DMC), ethyl methyl carbonate (EMC), diethyl carbonate (DEC) and combinations thereof.

Salts. The solute of the electrolytic solution of the invention is an ionic salt containing at least one metal ion. Typically this metal ion is lithium ($Li^+$). The salts herein function to transfer charge between the negative electrode and the positive electrode of a battery. The lithium salts are preferably halogenated, for example, $LiPF_6$, $LiBF_4$, $LiSbF_6$, $LiAsF_6$, $LiTaF_6$, $LiAlCl_4$, $Li_2B_{10}Cl_{10}$, $Li_2B_{10}F_{10}$, $LiClO_4$, $LiCF_3SO_3$, $Li_2B_{12}F_xH_{(12-x)}$ wherein x=0-12; $LiPF_x(R_F)_{6-x}$ and $LiBF_y(R_F)_{4-y}$ wherein $R_F$ represents perfluorinated $C_1$-$C_{20}$ alkyl groups or perfluorinated aromatic groups, x=0-5 and y=0-3, $LiBF_2[O_2C(CX_2)_nCO_2]$, $LiPF_2[O_2C(CX_2)_nCO_2]_2$, $LiPF_4[O_2C(CX_2)_nCO_2]$, wherein X is selected from the group consisting of H, F, Cl, $C_1$-$C_4$ alkyl groups and fluorinated alkyl groups, and n=0-4; $LiN(SO_2 C_mF_{2m+1})(SO_2C_nF_{2n+1})$, and $LiC(SO_2C_kF_{2k+1})(SO_2C_mF_{2m+1})(SO_2C_nF_{2n+1})$, wherein k=1-10, m=1-10, and n=1-10, respectively; $LiN(SO_2C_pF_{2p}SO_2)$, and $LiC(SO_2C_pF_{2p}SO_2)(SO_2C_qF_{2q+1})$ wherein p=1-10 and q=1-10; lithium salts of chelated orthoborates and chelated orthophosphates such as lithium bis(oxalato)borate [$LiB(C_2O_4)_2$], lithium bis(malonato) borate [$LiB(O_2CCH_2CO_2)_2$], lithium bis(difluoromalonato) borate [$LiB(O_2CCF_2CO_2)_2$], lithium (malonato oxalato) borate [$LiB(C_2O_4)(O_2CCH_2CO_2)$], lithium (difluoromalonato oxalato) borate [$LiB(C_2O_4)(O_2CCF_2CO_2)$], lithium tris(oxalato) phosphate [$LiP(C_2O_4)_3$], and lithium tris(difluoromalonato) phosphate [$LiP(O_2CCF_2CO_2)_3$]; and any combination of two or more of the aforementioned salts. Most preferably the electrolytic solution comprises $LiPF_6$.

The concentration of the solute in the electrolytic solution may be any concentration, but normally from 0.1 to 3.0 M (mol/liter) but is preferably from 0.5 to 2.0 M.

Cathode. The cathode comprises at least one lithium mixed metal oxide (Li-MMO). Lithium mixed metal oxides contain at least one other metal selected from the group consisting of Mn, Co, Cr, Fe, Ni, V, and combinations thereof. For example the following lithium MMOs may be used in the cathode: $LiCoO_2$, $LiMnO_2$, $LiMn_2O_4$, $Li_2Cr_2O_7$, $Li_2CrO_4$, $LiNiO_2$, $LiFeO_2$, $LiNi_xCo_{1-x}O_2$ (0<x<1), $LiFePO_4$, $LiVPO_4$, $LiMn_zNi_{1-z}O_2$, (0<z<1) (which includes $LiMn_{0.5}Ni_{0.5}O_2$), $LiMn_{1/3}$ $Co_{1/3}Ni_{1/3}O_2$, $LiMc_{0.5}Mn_{1.5}O_4$, wherein Mc is a divalent metal; and $LiNi_xCo_yMe_zO_2$ wherein Me may be one or more of Al, Mg, Ti, B, Ga, or Si and $0<x,y,z<1$. Furthermore, transition metal oxides such as $MnO_2$ and $V_2O_5$; transition metal sulfides such as $FeS_2$, $MoS_2$ and $TiS_2$; and conducting polymers such as polyaniline and polypyrrole may be present. The preferred positive electrode material is the lithium transition metal oxide, including, especially, $LiCoO_2$, $LiMn_2O_4$, $LiNi_{0.80}Co_{0.15}Al_{0.05}O_2$, $LiFePO_4$, and $LiNi_{1/3}Mn_{1/3}Co_{1/3}O_2$. Mixtures of such oxides may also be used.

Anode. The anode material is selected from lithium metal, lithium alloys, carbonaceous materials and lithium metal oxides capable of being intercalated and de-intercalated with lithium ions. Carbonaceous materials useful herein include graphite, amorphous carbon and other carbon materials such as activated carbon, carbon fiber, carbon black, and mesocarbon microbeads. Lithium metal anodes may be used. Lithium MMOs such as $LiMnO_2$ and $Li_4Ti_5O_{12}$ are also envisioned. Alloys of lithium with transition or other metals (including metalloids) may be used, including LiAl, LiZn, $Li_3Bi$, $Li_3Cd$, $Li_3Sb$, $Li_4Si$, $Li_{4.4}Pb$, $Li_{4.4}Sn$, $LiC_6$, $Li_3FeN_2$, $Li_{2.6}Co_{0.4}N$, $Li_{2.6}Cu_{0.4}N$, and combinations thereof. The anode may further comprise an additional material such as a metal oxide including SnO, $SnO_2$, GeO, $GeO_2$, $In_2O$, $In_2O_3$, PbO, $PbO_2$, $Pb_2O_3$, $Pb_3O_4$, $Ag_2O$, AgO, $Ag_2O_3$, $Sb_2O_3$, $Sb_2O_4$, $Sb_2O_5$, SiO, ZnO, CoO, NiO, FeO, and combinations thereof.

Either the anode or the cathode, or both, may further comprise a polymeric binder. In a preferred embodiment, the binder may be polyvinylidene fluoride, styrene-butadiene rubber, polyamide or melamine resin, and combinations thereof.

The electrolytic solution in the present invention may further comprise one or more additives, such as a sultone (e.g., 1,3-propane sultone, and 1,4-butane sultone) and/or an acidic anhydride (e.g. succinic anhydride) to prevent or to reduce gas generation of the electrolytic solution as the battery is charged and discharged at temperatures higher than ambient temperature, and/or an aromatic compound (e.g., biphenyl and cyclohexylbenzene) to prevent overcharge of the battery.

An embodiment of the invention is a secondary battery comprising an anode, a cathode, and an electrolytic solution, the electrolytic solution comprising a non-aqueous electrolytic solvent selected from the group consisting of 4-methylene-1,3-dioxolan-2-one, 4,5-dimethylene-1,3-dioxolan-2-one, and combinations thereof.

Another embodiment is a secondary battery comprising an anode, a cathode, a lithium salt, and an electrolytic solution, the electrolytic solution comprising a non-aqueous solvent selected from the group consisting of 4-methylene-1,3-dioxolan-2-one, 4,5-dimethylene-1,3-dioxolan-2-one, and combinations thereof, provided that the total concentration of 4-methylene-1,3-dioxolan-2-one and 4,5-dimethylene-1,3-dioxolan-2-one in the solution does not exceed about 10 wt %. Preferably, the combination of 4-methylene-1,3-dioxolan-2-one and 4,5-dimethylene-1,3-dioxolan-2-one does not exceed about 4 wt % of the solution.

Yet another embodiment of the invention is a method of making a lithium battery or lithium ion battery comprising:
a. providing an electrolytic solution comprising
  i. a non-aqueous solvent selected from the group consisting of 4-methylene-1,3-dioxolan-2-one, 4,5-dimethylene-1,3-dioxolan-2-one, and combinations thereof,
  ii. a lithium salt,
b. laminating and winding a cathode, a first porous separator, an anode, and a second porous separator,
c. placing the wound laminated electrodes and separators into a battery case,
d. infusing the electrolytic solution into the battery case, and
e. sealing the battery case containing the electrodes, electrolytic solution and separators.

In the method, the electrolytic solution may further comprise an amine oxide having the formula wherein $R^1$, $R^2$, and $R^3$ are independently each a $C_1$ to $C_{36}$ hydrocarbon residue. Further, at least one of $R^1$, $R^2$, and $R^3$ may further comprise —O—, —S—, —CO—, —$CO_2$—, —SO—, —$SO_2$—, —$NR^4$—, —$NR^5R^6$, —$PR^7$—, or —Si($R^8R^9$)—, wherein $R^4$ to $R^9$ are independently selected from the group consisting of hydrogen, halogen, $C_1$ to $C_{20}$ saturated alkyl, $C_1$-$C_{20}$ alkenyl, or substituted alkyl, phenyl, or substituted phenyl, or combinations thereof.

Alternatively, the electrolytic solution may further comprise a triazine compound having the formula 2-$R^1$, 4-$R^2$, 6-$R^3$-1,3,5-triazine, wherein $R^1$, $R^2$, and $R^3$ are independently selected from the group consisting of hydrogen, halogen, $C_1$-$C_{20}$ alkyl, $C_1$-$C_{20}$ alkenyl, phenyl, and substituted phenyl. In the triazine compound, at least one of $R^1$, $R^2$, and $R^3$ may further comprise a substituent selected from the group consisting of —O—, —S—, —CO—, —$CO_2$—, —SO—, —$SO_2$—, —$NR^4$—, —$NR^5R^6$, —$PR^7$—, or —Si($R^8R^9$)—, wherein $R^4$ to $R^9$ are independently selected from the group consisting of hydrogen, halogen, $C_1$ to $C_{20}$ saturated alkyl, $C_1$-$C_{20}$ alkenyl, or substituted alkyl, phenyl, or substituted phenyl.

A preferred embodiment involves a secondary battery comprising an electrolytic solution, wherein the electrolytic solution comprises a non-aqueous solvent, a solute, and a salt additive, the non-aqueous electrolytic solution comprising at least one of 4-methylene-1,3-dioxolan-2-one and 4,5-dimethylene-1,3-dioxolan-2-one, provided that the total concentration of 4-methylene-1,3-dioxolan-2-one and 4,5-dimethylene-1,3-dioxolan-2-one in the solution does not exceed about 10 wt % wherein the non-aqueous solvent comprises about 1 to about 80 wt % ethylene carbonate, about 1 to about 80 wt % propylene carbonate and about 1 to about 80 wt % diethyl carbonate.

In another preferred embodiment, the non-aqueous electrolytic solution comprises ethylene carbonate, dimethyl carbonate and ethyl methyl carbonate; $LiPF_6$; at least one of 4-methylene-1,3-dioxolan-2-one and 4,5-dimethylene-1,3-dioxolan-2-one; and a composition having Chemical Abstracts Service Registry Number 204933-93-7.

It is envisioned that the salt additives, electrolytic solutions and batteries discussed herein have a wide range of applications, including, at least, calculators, wrist watches, hearing aids, electronics such as computers, cell phones, and games, and transportation applications such as battery powered and/or hybrid vehicles.

The following compositions represent exemplary embodiments of the invention. They are presented to explain the invention in more detail, and do not limit the invention.

EXAMPLES (1) Preparation of Electrolytic Solutions. Ethylene carbonate (EC) and ethyl methyl carbonate (EMC) were mixed in a volume ratio of 3:7 to prepare a non-aqueous organic solvent mixture. To this mixture, 1.0M lithium hexafluorophosphate (LiPF$_6$) was added to give the Electrolytic Solution A. Various additives were added into Electrolytic Solution A at different amounts to give Examples 1 to 6 and Comparative Examples 1 to 4 as shown in Table 2. The comparative examples represent the prior art, and are not part of the invention. The additives used are: methyleneethylene carbonate (i.e. 4-methylene-1,3-dioxolan-2-one), vinylene carbonate, vinylethylene carbonate, fluoroethylene carbonate. All exemplary solutions were formulated at ambient temperature (ca. 23° C.).

TABLE 2

Electrolyte Samples from Electrolyte Solution A

| Example | Additive Name | Additive Amount |
|---|---|---|
| Example 1 | Methyleneethylene carbonate | 0.1 wt % |
| Example 2 | Methyleneethylene carbonate | 0.5 wt % |
| Example 3 | Methyleneethylene carbonate | 1.0 wt % |
| Example 4 | Methyleneethylene carbonate | 2.0 wt % |
| Example 5 | Methyleneethylene carbonate | 4.0 wt % |
| Example 6 | Methyleneethylene carbonate | 6.0 wt % |
| Comparative Example 1 | None | None |
| Comparative Example 2 | Vinylene carbonate | 1.0 wt % |
| Comparative Example 3 | Vinylethylene carbonate | 1.0 wt % |
| Comparative Example 4 | Fluoroethylene carbonate | 1.0 wt % |

Ethylene carbonate (EC), propylene carbonate (PC) and dimethyl carbonate (DMC) were mixed in a weight ratio of 3:1:6 to prepare a non-aqueous organic solvent mixture. 1.0M LiPF$_6$ was added into the solvent mixture to give the Electrolyte Solution B. Then different additives were added into the Electrolyte Solution B at different amounts to give Examples 7 and 8 and Comparative Examples 5 to 8 as shown in Table 3.

TABLE 3

Electrolyte Samples from Electrolyte Solution B

| Example | Additive Name | Additive Amount |
|---|---|---|
| Example 7 | Methyleneethylene carbonate | 0.5 wt % |
| Example 8 | Methyleneethylene carbonate | 1.0 wt % |
| Comparative Example 5 | None | None |
| Comparative Example 6 | Vinylene carbonate | 1.0 wt % |
| Comparative Example 7 | Vinylethylene carbonate | 1.0 wt % |
| Comparative Example 8 | Fluoroethylene carbonate | 1.0 wt % |

(2) Preparation of a Cathode. A positive electrode slurry was prepared by dispersing LiCoO$_2$ (as positive electrode active material, 90 wt %), poly(vinylidenefluoride) (PVdF, as bonder, 5 wt %), and acetylene black (as electro-conductive agent, 5 wt %) into 1-methyl-2-pyrrolidone (NMP). The slurry was coated on aluminum foil, dried, and compressed to give a positive electrode. The cathode electrode was die-cut into discs by a punch with a diameter of 9/16 inch (i.e. 14.3 mm).

(3) Preparation of an Anode. Artificial graphite (as negative electrode active material, 95 wt %) and PVdF (as binder, 5 wt %) were mixed into NMP to give a negative active material slurry which was coated on copper foil, dried, and pressed to give a negative electrode. The anode electrode was die-cut into discs by a punch with a diameter of 5/8 inch (15.9 mm).

(4) Assembly of a Lithium Ion Secondary Battery. In a dry box under an argon atmosphere, a lithium ion secondary battery was assembled using a 2032 type coin cell. A cathode was placed on a cathode can, and a microporous polypropylene film having a thickness of 25 microns and a diameter of ¾ inch (19.1 mm) diameter was placed as a separator. It was pressed with a polypropylene gasket, and an anode was placed. A stainless steel spacer and spring were included to adjust the thickness and make good contact. An electrolyte solution from Examples 1 to 8 and Comparative Examples 1 to 8 was allowed to absorb into each of 16 separate batteries. An anode cover was mounted to seal each battery by a crimper, to complete the assembly of the coin type lithium ion secondary battery.

(5) Testing of the Batteries. Evaluation of the aforementioned assembled battery was carried out by initial charging and discharging process (capacity confirmation), followed by life cycle testing.

Initial charging and discharging of the aforementioned assembled battery was performed to form the solid electrolyte interface (SEI) on graphite electrode according to the constant current/voltage charging and the constant current discharging method in a room temperature atmosphere. That is, the battery was first charged up to 4.2 V at a constant current rate of 0.5 mA/cm$^2$. After reaching 4.2 V, the battery was continually charged at a constant voltage of 4.2 V until the charging current was less than or equal to 0.1 mA. Then the battery was discharged at a constant current rate of 0.5 mA/cm$^2$ until the cut-off voltage 3.0 V reached. Standard capacity of a non-aqueous electrolyte secondary battery was 4.2 mAh.

Cycle life test was conducted at room temperature by charging the aforementioned initially charged/discharged battery at a constant current rate of C/2 (2.1 mA) to 4.2 V and then charged at a constant voltage of 4.2 V until the current was less than or equal to 0.1 mA. The battery was then discharged at a constant current rate of C/2 (2.1 mA) until the cut-off voltage 3.0 V was reached. The 1$^{st}$ cycle efficiency and discharge capacity retention of each example cell are shown in Table 4. Discharge capacity retention rate of cycle life (%)=(n$^{th}$ cycle discharge capacity/1$^{st}$ cycle discharge capacity)×100%. NM means not measured.

TABLE 4

Cell performance of coin type batteries containing different electrolytes

| Example | 1$^{st}$ cycle discharge capacity (mAh) | 1$^{st}$ cycle efficiency | Discharge capacity retention 60$^{th}$ cycle | 100$^{th}$ cycle |
|---|---|---|---|---|
| Example 1 | 4.06 | 97.3% | 83.0% | 82.8% |
| Example 2 | 4.19 | 97.7% | 89.7% | 86.6% |
| Example 3 | 3.95 | 97.1% | 93.7% | 93.2% |
| Example 4 | 3.26 | 97.3% | 96.9% | 96.3% |
| Example 5 | 2.26 | 85.5% | 80.1% | 81.9% |
| Example 6 | 1.33 | 77.7% | 66.1% | 75.1% |
| Comparative Example 1 | 4.12 | 94.5% | 71.4% | 65.8% |
| Comparative Example 2 | 4.21 | 98.4% | 89.3% | 87.2% |
| Comparative Example 3 | 4.01 | 97.1% | 88.5% | 86.0% |
| Comparative Example 4 | 3.89 | 94.2% | 94.3% | 91.0% |
| Example 7 | 4.06 | 97.1% | 86.5% | NM |
| Example 8 | 4.12 | 95.9% | 96.4% | NM |
| Comparative Example 5 | 3.79 | 94.0% | 70.7% | NM |
| Comparative Example 6 | 4.14 | 94.6% | 85.5% | NM |
| Comparative Example 7 | 4.08 | 93.7% | 84.6% | NM |
| Comparative Example 8 | 3.99 | 94.2% | 92.2% | NM |

It is seen from Table 4 that when methyleneethylene carbonate of the invention was added in an amount from 0.1 to 2% by weight into electrolyte solutions especially the electrolyte solutions containing PC, the cell performance such as discharge capacity and capacity retention of the electrolyte solutions were improved compared with the control solution. However, when methyleneethylene carbonate was added in an amount of 4% by weight and greater, the cell performance began to deteriorate. Thus the preferred amount of methyleneethylene carbonate is about 0.01% to 4% by weight in the electrolyte solutions.

It is also seen from Table 4 that, holding the amount of additive constant, methyleneethylene carbonate of the invention exhibits better cell discharge capacity retention than other commonly used additives such as vinylene carbonate, vinylethylene carbonate and fluoroethylene carbonate, especially when the electrolyte solutions contain PC.

While the invention herein disclosed has been described by means of specific embodiments and applications thereof, numerous modifications and variations could be made thereto by those skilled in the art without departing from the scope of the invention set forth in the claims. Furthermore, various aspects of the invention may be used in other applications than those for which they were specifically described herein.

The invention claimed is:

1. A secondary battery comprising:
   a. an anode,
   b. a cathode, and,
   c. an electrolytic solution, comprising a non-aqueous electrolytic solvent selected from the group consisting of 4-methylene-1,3-dioxolan-2-one, 4,5-dimethylene-1,3-dioxolan-2-one, and combinations thereof.

2. The secondary battery of claim 1, wherein the electrolytic solution further comprises a salt selected from the group consisting of $LiPF_6$, $LiBF_4$, $LiSbF_6$, $LiAsF_6$, $LiTaF_6$, $LiAlCl_4$, $Li_2B_{10}Cl_{10}$, $Li_2B_{12}F_xH_{(12-x)}$ wherein x=0-12, $LiB(C_2O_4)_2$, $LiB(O_2CCH_2CO_2)_2$, $LiB(O_2CCF_2CO_2)_2$, $LiB(C_2O_4)(O_2CCH_2CO_2))$, $LiB(C_2O_4)(O_2CCF_2CO_2)$, $LiP(C_2O_4)_3$, $LiP(O_2CCF_2CO_2)_3$, $LiClO_4$, $LiCF_3SO_3$; $LiN(SO_2C_mF_{2m+1})(SO_2C_nF_{2n+1})$, $LiC(SO_2C_kF_{2k+1})(SO_2C_mF_{2m+1})(SO_2C_nF_{2n+1})$, wherein k=1-10, m=1-10, and n=1-10, respectively; $LiN(SO_2C_pF_{2p}SO_2)$, and $LiC(SO_2C_pF_{2p}SO_2)(SO_2C_qF_{2q+1})$ wherein p=1-10 and q=1-10; $LiPF_x(R_F)_{6-x}$ and $LiBF_y(R_F)_{4-y}$, wherein RF represents perfluorinated $C_1$-$C_{20}$ alkyl groups or perfluorinated aromatic groups, x=0-5, and y=0-3; $LiBF_2[O_2C(CX_2)_nCO_2]$, $LiPF2[O_2C(CX_2)_nCO_2]$, $LiPF_4[O_2C(CX_2)_nCO_2]$, wherein X is selected from the group consisting of H, F, Cl, $C_1$-$C_4$ alkyl groups and fluorinated alkyl groups, and n=0-4; and combinations thereof.

3. The secondary battery of claim 1, wherein the electrolytic solution further comprises a non-aqueous solvent selected from the group consisting of ethylene carbonate, propylene carbonate, butylene carbonate, dimethyl carbonate, diethyl carbonate, di(2,2,2-trifluoroethyl) carbonate, dipropyl carbonate, dibutyl carbonate, ethyl methyl carbonate, 2,2,2-trifluoroethyl methyl carbonate, methyl propyl carbonate, ethyl propyl carbonate, 2,2,2-trifluoroethyl propyl carbonate, methyl formate, ethyl formate, propyl formate, butyl formate, methyl acetate, ethyl acetate, propyl acetate, butyl acetate, methyl propionate, ethyl propionate, propyl propionate, butyl propionate, methyl butyrate, ethyl butyrate, propyl butyrate, butyl butyrate, tetrahydrofuran, 2-methyl tetrahydrofuran, 1,3-dioxolane, 1,4-dioxane, 1,2-dimethoxyethane, 1,2-diethoxyethane, 1,2-dibutoxyethane, acetonitrile, dimethylformamide, γ-butyrolactone, 2-methyl-γ-butyrolactone, 3-methyl-γ-butyrolactone, 4-methyl-γ-butyrolactone, -propiolactone, δ-valerolactone, trimethyl phosphate, triethyl phosphate, tris(2-chloroethyl) phosphate, tris(2,2,2-trifluoroethyl) phosphate, tripropyl phosphate, triisopropyl phosphate, tributylphosphate, trihexyl phosphate, triphenyl phosphate, tritolyl phosphate, methyl ethylenephosphate, ethyl ethylene phosphate, dimethyl sulfone, ethyl methyl sulfone, methyltrifluoromethyl sulfone, ethyl trifluoromethyl sulfone, methyl pentafluoroethyl sulfone, ethyl pentafluoroethyl sulfone, di(trifluoromethyl) sulfone, di(pentafluoroethyl) sulfone, trifluoromethyl pentafluoroethyl sulfone, trifluoromethyl nonafluorobutyl sulfone, pentafluoroethyl nonafluorobutyl sulfone, acetonitrile, propionitrile, butyronitrile N,N-dimethylformamide, N,N-dimethyl acetamide, N,N-diethyl acetamide, N,N-dimethyl trifluoroacetamide and combinations thereof.

4. The secondary battery of claim 1, wherein the cathode comprises a lithium mixed metal oxide selected from the group consisting of $LiCoO_2$, $LiMnO_2$, $LiMn_2O_4$, $Li_2Cr_2O_7$, $Li_2CrO_4$, $LiNiO_2$, $LiFeO_2$, $LiNi_xCo_{1-x}O_2$ (0<x<1), $LiFePO_4$, $LiVPO_4$, $LiMn_{0.5}Ni_{0.5}O_2$, $LiNi_{1/3}Mn_{1/3}Co_{1/3})O_2$, $LiMe_{0.5}Mn_{1.5}O_4$ wherein Me is a divalent metal, $LiNi_xCo_yMe_zO_2$ wherein Me is selected from the group consisting of Al, Mg, Ti, B, Ga, and Si, and combinations thereof, and 0<x,y,z<1, and mixtures thereof.

5. The secondary battery of claim 4, wherein the cathode further comprises a binder selected from the group consisting of polyvinylidene fluoride, styrene-butadiene rubber, polyamide, melamine, and combinations thereof.

6. The secondary battery of claim 1, wherein the anode comprises a material selected from the group consisting of carbonaceous material, lithium metal, $LiMnO_2$, LiAl, LiZn, $Li_3Bi$, $Li_3Cd$, $Li_3Sd$, $Li_4Si$, $Li_{4.4}Pb$, $Li_{4.4}Sn$, $LiC_6$, $Li_3FeN_2$, $Li_{2.6}Co_{0.4}N$, $Li_{2.6}Cu_{0.4}N$, $Li_4Ti_5O_{12}$, and combinations thereof.

7. The secondary battery of claim 6, wherein the anode further comprises a binder selected from the group consisting of polyvinylidene fluoride, styrene-butadiene rubber, polyamide, melamine, and combinations thereof.

8. The secondary battery of claim 1, wherein the electrolytic solution further comprises a salt selected from the group consisting of $LiPF_6$, LiBF4, and combinations thereof.

9. The secondary battery of claim 1 wherein the non-aqueous electrolytic solution comprises:
   a. ethylene carbonate, dimethyl carbonate and ethylmethyl carbonate;
   b. $LiPF_6$;
   c. at least one of 4-methylene-1,3-dioxolan-2-one and 4,5-dimethylene-1,3-dioxolan-2-one; and
   d. a composition having Chemical Abstracts Service Registry Number 204933-93-7.

10. A secondary battery comprising an anode, a cathode, and an electrolytic solution, wherein the electrolytic solution comprises an unsaturated organic compound selected from the group consisting of 4-methylene-1,3-dioxolan-2-one, 4,5-dimethylene-1,3-dioxolan-2-one, and combinations thereof, provided that the total concentration of 4-methylene-1,3-dioxolan-2-one and 4,5-dimethylene-1,3-dioxolan-2-one in the solution does not exceed about 10 wt % of the electrolytic solution.

11. The secondary battery of claim 10, wherein the total concentration of 4-methylene-1,3-dioxolan-2-one and 4,5-dimethylene-1,3-dioxolan-2-one in the solution does not exceed about 4 wt % of the electrolytic solution.

12. The secondary battery of claim 10, wherein the anode comprises a material selected from the group consisting of carbonaceous material, lithium metal, $LiMnO_2$, LiAl, LiZn, $Li_3Bi$, $Li_3Cd$, Li3Sb, $Li_4Si$, $Li_{4.4}Pb$, $Li_{4.4}Sn$, $LiC_6$, $Li_3FeN_2$, $Li_{2.6}Co_{0.4}N$, $Li_{2.6}Cu_{0.4}N$, $Li_4Ti_5O_{12}$, and combinations thereof.

13. The secondary battery of claim 10, wherein the anode comprises a first material selected from the group consisting of carbonaceous material, lithium metal, $LiMnO_2$, LiAl, LiZn, $Li_3Bi$, $Li_3Cd$, $Li_3Sb$, $Li_4Si$, $Li_{4.4}Pb$, $Li_{4.4}Sn$, $LiC_6$, $Li_3FeN_2$, $Li_{2.6}Co_{0.4}N$, $Li_{2.6}Cu_{0.4}N$, $Li_4Ti_5O_{12}$, and combinations thereof, and a second material selected from the group consisting of SnO, $SnO_2$, GeO, $GeO_2$, $In_2O$, $In_2O_3$, PbO, $PbO_2$, $Pb_2O_3$, $Pb_3O_4$, $Ag_2O$, AgO, $Ag_2O_3$, $Sb_2O_3$, $Sb_2O_4$, $Sb_2O_5$, SiO, ZnO, CoO, NiO, FeO, and combinations thereof.

* * * * *